United States Patent Office 3,328,357
Patented June 27, 1967

3,328,357
N-HYDROXYMALEIMIDE COPOLYMERS
Sherman C. Lashua, Midland, Mich., assignor to The Dow Chemical Company, Midland, Mich., a corporation of Delaware
No Drawing. Filed June 3, 1964, Ser. No. 372,397
3 Claims. (Cl. 260—77.5)

The present invention is concerned with novel copolymers of N-vinyl-cyclic carbamates with N-hydroxymaleimide and metal salts thereof. This copolymer may be represented by a plurality of recurring groups having an infrared-identified structure corresponding to

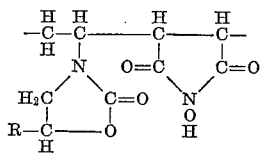

wherein R is hydrogen, methyl or ethyl. These new copolymers are prepared by reacting an N-vinyl-cyclic carbamate and maleic anhydride to form a copolymer which is then reacted with hydroxylamine. The novel copolymers of the present invention may be prepared in a wide range of relatively high molecular weights by employing as a starting material the N-vinyl-cyclic carbmate-maleic anhydride copolymers described in U.S. Patent 3,044,992.

The novel N-vinyl-cyclic carbamte-N-hydroxy-maleimide copolymers of this invention are white to light yellow powders melting above 250° C. which show excellent aqueous solubility over a temperature range of 0° to 100° C., and are advantageously employed as dye assistants, especially in conjunction with acrylonitrile homopolymers and copolymers.

Metal salts of the copolymers of this invention are prepared by mixing the water-soluble copolymer with a water-soluble salt of the metal. The copolymer salt formed is insoluble and is recovered by filtration. These salts have a characteristic color imparted by the particular metal ion employed and demonstrate anthelmintic activity.

In the general method of preparing the novel copolymers of the present invention, a neutral solution of hydroxylamine is prepared in a suitable solvent and the N-vinyl-cyclic carbamate-maleic anhydride copolymer is slowly added to this solution with stirring and temperature control. After allowing sufficient time for the reaction to go to completion, an excess or solvent is added to the reaction mixture and the N-vinyl-cyclic carbamate-N-hydroxymaleimide copolymer is obtained as a precipitate which is filtered and dried. The temperature maintained during the reaction is from about −10° C. to the boiling point of the solvent with a temperature of about 0° to 40° C. preferred. The solvent employed may be chosen from a wide range of materials which dissolve the reactants and product and are inert towards them. Suitable solvents will be readily discernible to those skilled in the art. Preferred solvents are the lower alkanols. At very high N-vinyl-cyclic carbamate-maleic anhydride molecular weights, the copolymer reactant may at first form a slurry instead of dissolving in the solvent employed and additional amounts of solvent may be required to effect solution. Since the product precipitates in an excess of the solvent, it is preferable to employ the minimum amount of solvent necessary to effect solution of the reactants. After a clear solution of the reactants is obtained, an additional period of time is preferably allowed to insure completion of the reaction.

The following examples illustrate the present invention but are not to be construed as limiting the same.

Example 1

A solution of 7.7 grams (0.11 mole) of hydroxylamine hydrochloride in 61.8 ml. of methanol and a solution of 6.2 grams (0.11 mole) of potassium hydroxide in 15.5 ml. of methanol were separately prepared at reflux temperatures. After cooling to about 40° C. the solutions were mixed with swirling. On mixing, a precipitate of potassium chloride formed leaving neutralized hydroxylamine in solution. The mixture was placed in an ice-bath to promote complete precipitation of the salt and then the precipitate was removed by vacuum filtration. The filtrate was transferred to a three-necked round-bottom flask equipped with a condenser and sealed stirrer. This flask was then immersed in an ice-bath and 25 grams (0.11 mole) of N-vinyl-5-methyl-2-oxazolidinone-maleic anhydride copolymer was slowly added with stirring. The copolymer added dissolved within a short time and after solution, stirring was continued for three hours. At the end of this time the contents of the flask were poured into excess methanol and a precipitate formed which was filtered and dried under vacuum. The product was identified through infrared analysis as N-vinyl-5-methyl-2-oxazolidinone-N-hydroxymaleimide copolymer (hereinafter referred to as VOM–NHMI copolymer).

Hydroxylamine acid sulfate is also employed as a starting material in place of the hydroxylamine hydrochloride used in the above example.

Example 2

Separate solutions of 69.5 grams (1 mole) of hydroxylamine hydrochloride in 325 ml. of methanol and 56 grams (1 mole) of potassium hydroxide in 140 ml. of the methanol were prepared at reflux temperatures and then allowed to cool to about 40° C. The resulting solutions were slowly mixed with swirling and intermittent cooling in an ice-bath. A precipitate of potassium chloride formed immediately and was removed by suction filtration after cooling the mixture in an ice-bath to promote complete salt precipitation. A quantity of 21.8 grams of hydroxylamine (0.66 mole) in 465 ml. of methanol, prepared in the above manner, was placed in a one-liter, three-necked, round-bottom flask equipped with a sealed stirrer and condenser. The flask was immersed in an ice-bath and 150 grams (0.66 mole) of N-vinyl-5-methyl-2-oxazolidinone-maleic anhydride copolymer (prepared as described in U.S. Patent 3,044,992 and having a Fikentscher K value of 19) was slowly added with stirring. A clear solution formed after three hours and the reaction was allowed to run overnight. The desired copolymer product (VOM–NHMI) was isolated by the addition of an excess of isopropanol to form a precipitate which was filtered and dried in a vacuum oven. The product was in the form of a white powder melting at above 250° C. Infrared analysis indicated approximately 95 percent of the anhydride units had reacted to form the desired VOM–NHMI copolymer.

In a similar manner, N-vinyl-2-oxazolidinone and N-vinyl-5-ethyl-2-oxazolidinone are substituted for N-vinyl-5-methyl-2-oxazolidinone in the above examples to obtain the corresponding N-vinyl-2-oxazolidinone-N-hydroxymaleimide and N-vinyl-5-ethyl-2-oxazolidinone-N-hydroxymaleimide copolymers.

The copolymer products obtained above show gross acidic properties in aqueous solution and are advantageously employed as dye assistants for polyacrylonitrile fibers with no harmful attack on fiber strength. A polyacrylonitrile tow is impregnated with the novel copolymer of the present invention by soaking the tow for several minutes in a boiling aqueous solution containing from about 2–5 percent by weight of the copolymer product of the present invention. The impregnated tow is then washed repeatedly with cold water and dried in an oven at 150° C. for thirty minutes. Subsequent dyeing of the tow, e.g. in crystal violet solution, resulted in greatly improved dye pickup and retention as compared to the non-impregnated tow.

The metal salts of the copolymer of the present invention are prepared by adding a water-soluble metal salt to an aqueous solution of the copolymer and recovering the water-insoluble copolymer salt which is precipitated.

*Example 3*

A quantity of 15 grams of VOM–NHMI copolymer was dissolved in 250 ml. of distilled water. A separate solution of 5 grams of anhydrous copper sulfate was prepared in 50 ml. of distilled water. The copper sulfate solution was then added, with stirring, to the dissolved copolymer and a green flocculant precipitate formed which was filtered and dried. In a similar fashion, iron, barium, cobalt and tin salts of the VOM–NHMI copolymer were prepared. All of these metal salts of the copolymer were tested for anthelmintic activity, e.g. on mouse trichostrongylid (*Nematospiriodes dubius*) and pig ascarids (*Ascaris suum*), with positive results.

I claim:
1. A water-soluble resinous polymer of the formula:

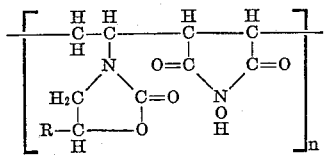

wherein R is selected from the group consisting of hydrogen, methyl and ethyl and *n* represents a value greater than about ten.

2. The metal salts of the polymer of claim 1 which are the product of the process of adding a water-soluble salt of a metal selected from the group consisting of copper, tin, cobalt, iron and barium to the polymer of claim 1.

3. A method of preparing the polymer of claim 1 which comprises the steps of:
   (1) mixing together
      (a) a water-soluble copolymer of maleic anhydride with an N-vinyl cyclic carbamate selected from the group consisting N-vinyl-2-oxazolidinone, N-vinyl-5-methyl-2-oxazolidinone and N-vinyl-5-ethyl-2-oxazolidinone wherein the moieties derived from the maleic anhydride and the cyclic carbamate are incorporated in substantially equimolar proportions, said copolymer being characterized by a Fikentscher K value of at least about 10, and
      (b) hydroxylamine, said copolymer and hydroxylamine being employed in substantially equimolar proportions,
   (2) in an inert solvent,
   (3) at a temperature of from about −10° C. to the boiling point of said solvent, and
   (4) precipitating the N-vinyl-cyclic carbamate-N-hydroxymaleimide polymer product by the addition of an excess of said solvent.

References Cited

UNITED STATES PATENTS 3,030,339  4/1962  Tousignant et al. ____ 260—77.5
3,044,992  7/1962  Hibbard et al. _____ 260—77.5

DONALD E. CZAJA, *Primary Examiner.*

LEON J. BERCOVITZ, *Examiner.*

J. J. KLOCKO, G. W. RAUCHFUSS,
*Assistant Examiners.*